(12) United States Patent
Yang

(10) Patent No.: US 10,187,866 B2
(45) Date of Patent: Jan. 22, 2019

(54) REGISTERING, DEREGISTERING AND STANDBY PROCESSING METHODS AND SYSTEMS FOR TERMINAL PERIPHERAL

(71) Applicant: ZTE Corporation, Shenzhen (CN)

(72) Inventor: Kun Yang, Shenzhen (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 43 days.

(21) Appl. No.: 15/123,761

(22) PCT Filed: May 15, 2014

(86) PCT No.: PCT/CN2014/077602
§ 371 (c)(1),
(2) Date: Sep. 6, 2016

(87) PCT Pub. No.: WO2015/135251
PCT Pub. Date: Sep. 17, 2015

(65) Prior Publication Data
US 2017/0019872 A1    Jan. 19, 2017

(30) Foreign Application Priority Data
Mar. 14, 2014    (CN) .......................... 2014 1 0097906

(51) Int. Cl.
*H04W 60/04*        (2009.01)
*H04W 4/08*         (2009.01)
(Continued)

(52) U.S. Cl.
CPC ......... *H04W 60/04* (2013.01); *H04L 61/2069* (2013.01); *H04W 4/08* (2013.01);
(Continued)

(58) Field of Classification Search
None
See application file for complete search history.

(56) References Cited

U.S. PATENT DOCUMENTS

2011/0134841 A1*    6/2011    Shaheen ................. H04W 4/00
                                                               370/328
2011/0268047 A1    11/2011    Nath
(Continued)

FOREIGN PATENT DOCUMENTS

CN    101998485 A    3/2011
CN    102215457 A    10/2011
(Continued)

OTHER PUBLICATIONS

European Search Report for corresponding application EP 14 88 5262; dated Mar. 23, 2017.
(Continued)

*Primary Examiner* — Diane L Lo
(74) *Attorney, Agent, or Firm* — Cantor Colburn LLP

(57) ABSTRACT

Provided are registering, deregistering and standby processing methods and systems for a terminal peripheral. The registering method includes that: a Machine-to-Machine/Man (M2M) gateway pre-allocates a terminal peripheral group identifier of a terminal peripheral group to a terminal peripheral configured into the terminal peripheral group by an M2M user, and sets an initial state of the terminal peripheral, the terminal peripheral group identifier being used for identifying the terminal peripheral group to which the terminal peripheral belongs; the M2M gateway acquires a terminal peripheral identifier of the terminal peripheral initiating a registering request, and determines the terminal peripheral group identifier pre-allocated to the terminal peripheral according to the terminal peripheral identifier; and the M2M gateway sends the terminal peripheral identifier and the terminal peripheral group identifier to an M2M application through an M2M service platform.

20 Claims, 7 Drawing Sheets

(51) Int. Cl.
    *H04W 60/06*    (2009.01)
    *H04W 4/70*     (2018.01)
    *H04L 29/12*    (2006.01)
    *H04W 12/06*    (2009.01)
    *H04W 88/16*    (2009.01)
(52) U.S. Cl.
    CPC ............ *H04W 4/70* (2018.02); *H04W 60/06* (2013.01); *H04W 12/06* (2013.01); *H04W 88/16* (2013.01)

(56)  References Cited

U.S. PATENT DOCUMENTS

| 2013/0203412 | A1  | 8/2013  | Starsinic |              |
|--------------|-----|---------|-----------|--------------|
| 2014/0113626 | A1* | 4/2014  | Park      | H04W 68/02   |
|              |     |         |           | 455/435.1    |
| 2014/0330952 | A1* | 11/2014 | Starsinic | H04W 4/001   |
|              |     |         |           | 709/223      |

FOREIGN PATENT DOCUMENTS

| EP | 2667666 A1    | 11/2013 |
|----|---------------|---------|
| WO | 2012126484 A1 | 9/2012  |

OTHER PUBLICATIONS

International Search Report for corresponding application PCT/CN2014/077602 filed on May 15, 2014; dated Nov. 26, 2014.

* cited by examiner

REGISTERING, DEREGISTERING AND STANDBY PROCESSING METHODS AND SYSTEMS FOR TERMINAL PERIPHERAL

TECHNICAL FIELD

The present disclosure relates to the field of communication, and in particular to registering, deregistering and standby processing methods and systems for a terminal peripheral.

BACKGROUND

The architecture of a Machine-to-Machine/Man (M2M) communication system may be divided into an M2M application layer, an M2M service capability layer, a communication network layer, an M2M terminal and perception extension layer and a management supporting system.

According to capabilities of M2M terminal devices, the M2M terminal and perception extension layer may divide the M2M terminal devices into the following two types which are respectively introduced below.

One type of M2M terminal device is an M2M terminal with a capability of communicating with an M2M communication network. This type of M2M terminal can directly access an M2M service platform through the communication network, interact with the M2M service platform to implement operation such as registering, certification, authentication and the like over the terminal, provide perception information required by an application and perform service interaction with the application through the M2M service platform, and further receive management over a terminal peripheral.

The other type of M2M terminal device is an M2M gateway with a capability of communicating with the M2M communication network and an M2M stub network. Besides implementing access of the M2M stub network to the M2M communication network, this type of the M2M gateway can further receive information of nodes of the M2M stub network and perform protocol conversion between the M2M stub network and the M2M communication network. A terminal peripheral can only perform short-distance communication due to its own limits, and such a single terminal is called a terminal peripheral. A network formed by multiple such terminal nodes may be called an M2M stub network.

In a practical application process, a characteristic different from that of conventional mobile communication is introduced to an M2M service, for example, a group-based M2M characteristic. When the group-based M2M characteristic is activated, an M2M user, an M2M application or an M2M service platform can control, manage or charge M2M terminal nodes in groups according to service requirements. In such a manner, the group-based M2M characteristic provides a simpler mode for controlling/updating/charging the M2M terminal nodes by taking a group as a granularity, and reduces extra signaling overhead to avoid network congestion. When there are numerous M2M terminal nodes, using the group-based M2M characteristic can further save network resources. Each terminal node within one group may be located in the same position area, and/or have the same characteristic attribute, and/or belong to the same M2M user. For a network, each terminal node in the group is visible.

However, there is no effective mechanism for performing group management over terminal peripherals by an M2M gateway in the related technology.

SUMMARY

The present disclosure provides registering, deregistering and standby processing methods and systems for a terminal peripheral, so as to at least solve the problem that there is no effective mechanism for performing group management over terminal peripherals by an M2M gateway in the related technology.

According to an aspect of the embodiments of the present disclosure, a registering method for a terminal peripheral is provided.

The registering method for the terminal peripheral according to the embodiment of the present disclosure may include that: an M2M gateway pre-allocates a terminal peripheral group identifier of a terminal peripheral group to a terminal peripheral configured into the terminal peripheral group by an M2M user, and sets an initial state of the terminal peripheral. In the embodiment, the terminal peripheral group identifier may be used for identifying the terminal peripheral group to which the terminal peripheral belongs; the M2M gateway acquires a terminal peripheral identifier of the terminal peripheral initiating a registering request, and determines the terminal peripheral group identifier pre-allocated to the terminal peripheral according to the terminal peripheral identifier; and the M2M gateway sends the terminal peripheral identifier and the terminal peripheral group identifier to an M2M application through an M2M service platform. In the embodiment, the terminal peripheral identifier and the terminal peripheral group identifier may be used for the M2M application to locally create or update group configuration information corresponding to the terminal peripheral group after the M2M application certificates and authorizes the terminal peripheral.

In an exemplary embodiment, the step that the M2M gateway acquires the terminal peripheral identifier and determines the terminal peripheral group identifier according to the terminal peripheral identifier may include that: the M2M gateway receives a first registering request message from the terminal peripheral. In the exemplary embodiment, the first registering request message may carry the terminal peripheral identifier and a security certificate; and the M2M gateway locally retrieves the terminal peripheral group identifier after successfully authenticating the terminal peripheral according to the terminal peripheral identifier and the security certificate.

In an exemplary embodiment, the step that the M2M gateway sends the terminal peripheral identifier and the terminal peripheral group identifier to the M2M application through the M2M service platform may include that: the M2M service platform receives a second registering request message from the M2M gateway. In the exemplary embodiment, the second registering request message may carry the terminal peripheral identifier, the security certificate, the terminal peripheral group identifier and an application port identifier corresponding to the terminal peripheral; and the M2M service platform sends a configuration update notification message to the M2M application according to the application port identifier after successfully authenticating the terminal peripheral according to the terminal peripheral identifier and the security certificate. In the exemplary embodiment, the configuration update notification message may carry the terminal peripheral identifier and the terminal peripheral group identifier.

In an exemplary embodiment, after the step that the M2M gateway sends the terminal peripheral identifier and the terminal peripheral group identifier to the M2M application through the M2M service platform, the method may further include that: the M2M application locally creates or updates a terminal peripheral group list according to the terminal peripheral identifier and the terminal peripheral group identifier after certificating and authorizing the terminal peripheral.

In an exemplary embodiment, after the step that the M2M gateway sends the terminal peripheral identifier and the terminal peripheral group identifier to the M2M application through the M2M service platform, the method may further include that: the M2M service platform receives a configuration update response message from the M2M application. In the exemplary embodiment, the configuration update response message may carry authorization information of the terminal peripheral; and the M2M service platform locally creates or updates a terminal peripheral group list according to the terminal peripheral identifier and the terminal peripheral group identifier after acquiring the authorization information.

In an exemplary embodiment, after the step that the M2M service platform creates or updates the terminal peripheral group list, the method may further include that: the M2M gateway receives a registering response message from the M2M service platform, and updates a state of the terminal peripheral from an offline state initially set before registering is initiated into an online state; and the M2M gateway sends a registering confirmation message to the terminal peripheral.

According to another aspect of the embodiments of the present disclosure, a deregistering method for a terminal peripheral is provided.

The deregistering method for the terminal peripheral according to the embodiment of the present disclosure may include that: an M2M gateway acquires a terminal peripheral identifier of a terminal peripheral initiating a deregistering request, and determines, according to the terminal peripheral identifier, a terminal peripheral group identifier allocated to the terminal peripheral. In the embodiment, the terminal peripheral group identifier may be used for identifying a terminal peripheral group to which the terminal peripheral belongs; and the M2M gateway sends the terminal peripheral identifier and the terminal peripheral group identifier to an M2M application through an M2M service platform. In the embodiment, the identifier and the group identifier may be used for the M2M application to locally update or delete group configuration information corresponding to the terminal peripheral group.

In an exemplary embodiment, the step that the M2M gateway acquires the terminal peripheral identifier and determines the terminal peripheral group identifier according to the terminal peripheral identifier may include that: the M2M gateway receives a first deregistering request message from the terminal peripheral. In the exemplary embodiment, the first deregistering request message may carry the terminal peripheral identifier; and the M2M gateway locally retrieves the terminal peripheral group identifier according to the terminal peripheral identifier.

In an exemplary embodiment, the step that the M2M gateway sends the terminal peripheral identifier and the terminal peripheral group identifier to the M2M application through the M2M service platform may include that: the M2M service platform receives a second deregistering request message from the M2M gateway. In the exemplary embodiment, the second deregistering request message may carry the terminal peripheral identifier, the terminal peripheral group identifier and an application port identifier corresponding to the terminal peripheral; and the M2M service platform sends a configuration update notification message to the M2M application according to the application port identifier. In the exemplary embodiment, the configuration update notification message may carry the terminal peripheral identifier and the terminal peripheral group identifier.

In an exemplary embodiment, after the step that the M2M gateway sends the terminal peripheral identifier and the terminal peripheral group identifier to the M2M application through the M2M service platform, the method may further include that: the M2M application locally updates or deletes a terminal peripheral group list according to the terminal peripheral identifier and the terminal peripheral group identifier.

In an exemplary embodiment, after the step that the M2M gateway sends the terminal peripheral identifier and the terminal peripheral group identifier to the M2M application through the M2M service platform, the method may further include that: the M2M service platform receives a configuration update response message from the M2M application; and the M2M service platform locally updates or deletes a terminal peripheral group list according to the terminal peripheral identifier and the terminal peripheral group identifier.

In an exemplary embodiment, after the step that the M2M service platform updates or deletes the terminal peripheral group list, the method may further include that: the M2M gateway receives a deregistering response message from the M2M service platform, and updates a state of the terminal peripheral from an online state set after registering into an offline state; and the M2M gateway sends a deregistering confirmation message to the terminal peripheral.

According to another aspect of the embodiments of the present disclosure, a standby processing method for a terminal peripheral is provided.

The standby processing method for the terminal peripheral according to the embodiment of the present disclosure may include that: an M2M gateway receives a group service request message from an M2M application through an M2M service platform. In the embodiment, the group service request message may carry a terminal peripheral group identifier to which the group service request message is to be distributed; and the M2M gateway distributes the group service request message to all terminal peripherals in a terminal peripheral group corresponding to the terminal peripheral group identifier after activating part or all of terminal peripherals in a standby state in the terminal peripheral group.

In an exemplary embodiment, before the step that the M2M gateway receives the group service request message from the M2M application through the M2M service platform, the method may further include that: the M2M gateway receives a standby request message from one or more terminal peripherals in the terminal peripheral group. In the exemplary embodiment, the standby request messages may carry a terminal peripheral identifier of each terminal peripheral; and the M2M gateway updates the state of each of the one or more terminal peripherals from an online state into the standby state according to the terminal peripheral identifier of each terminal peripheral, and sends a standby confirmation message to the one or more terminal peripherals.

In an exemplary embodiment, the step that the M2M gateway receives the group service request message from the M2M application through the M2M service platform may include that: the M2M service platform performs service authentication on the M2M application; and the M2M service platform forwards the group service request message to the M2M gateway after successfully authenticating the M2M application.

In an exemplary embodiment, the step that the M2M gateway activates part or all of the terminal peripherals in the standby state may include that: the M2M gateway acquires the state of each terminal peripheral in the terminal peripheral group according to the terminal peripheral group identifier, and determines part or all of the terminal peripherals in the standby state; and the M2M gateway sends an activation request message to part or all of the terminal peripherals in the standby state. In the exemplary embodiment, the activation request message may be used for restoring part or all of the terminal peripherals in the standby state from the standby state to an online state.

In an exemplary embodiment, the step that the M2M gateway distributes the group service request message to all the terminal peripherals in the terminal peripheral group may include that: the M2M gateway determines that all the terminal peripherals in the terminal peripheral group are in the online state according to an activation response message; and the M2M gateway distributes the group service request message to the terminal peripherals according to a terminal peripheral identifier of each terminal peripheral in the terminal peripheral group.

According to another aspect of the embodiments of the present disclosure, a registering system for a terminal peripheral is provided.

The registering system for the terminal peripheral according to the embodiment of the present disclosure may include: an M2M gateway; the M2M gateway may include: a configuration module, configured to pre-allocate a terminal peripheral group identifier of a terminal peripheral group to a terminal peripheral configured into the terminal peripheral group by an M2M user, and set an initial state of the terminal peripheral. In the embodiment, the terminal peripheral group identifier may be used for identifying the terminal peripheral group to which the terminal peripheral belongs; a determination module, configured to acquire a terminal peripheral identifier of the terminal peripheral initiating a registering request, and determine the terminal peripheral group identifier pre-allocated to the terminal peripheral according to the terminal peripheral identifier; and a first sending module, configured to send the terminal peripheral identifier and the terminal peripheral group identifier to an M2M application through an M2M service platform. In the embodiment, the terminal peripheral identifier and the terminal peripheral group identifier may be used for the M2M application to locally create or update group configuration information corresponding to the terminal peripheral group after the M2M application certificates and authorizes the terminal peripheral.

In an exemplary embodiment, the determination module may include: a first receiving unit, configured to receive a first registering request message from the terminal peripheral. In the exemplary embodiment, the first registering request message may carry the terminal peripheral identifier and a security certificate; and a retrieval unit, configured to locally retrieve the terminal peripheral group identifier after successfully authenticating the terminal peripheral according to the terminal peripheral identifier and the security certificate.

In an exemplary embodiment, the first sending module may include: a second receiving unit, configured to receive a second registering request message from the M2M gateway. In the exemplary embodiment, the second registering request message may carry the terminal peripheral identifier, the security certificate, the terminal peripheral group identifier and an application port identifier corresponding to the terminal peripheral; and a sending unit, configured to send a configuration update notification message to the M2M application according to the application port identifier after successfully authenticating the terminal peripheral according to the terminal peripheral identifier and the security certificate. In the exemplary embodiment, the configuration update notification message may carry the terminal peripheral identifier and the terminal peripheral group identifier.

In an exemplary embodiment, the system may further include: the M2M application; and the M2M application may include: a first processing module, configured to locally create or update a terminal peripheral group list according to the terminal peripheral identifier and the terminal peripheral group identifier after certificating and authorizing the terminal peripheral.

In an exemplary embodiment, the system may further include: the M2M service platform; the M2M service platform may include: a first receiving module, configured to receive a configuration update response message from the M2M application. In the exemplary embodiment, the configuration update response message may carry authorization information of the terminal peripheral; and a second processing module, configured to locally create or update a terminal peripheral group list according to the terminal peripheral identifier and the terminal peripheral group identifier after acquiring the authorization information.

In an exemplary embodiment, the M2M gateway may further include: a second receiving module, configured to receive a registering response message from the M2M service platform, and update a state of the terminal peripheral from an offline state initially set before registering is initiated into an online state; and a second sending module, configured to send a registering confirmation message to the terminal peripheral.

According to another aspect of the embodiments of the present disclosure, a deregistering system for a terminal peripheral is provided.

The deregistering system for the terminal peripheral according to the embodiment of the present disclosure may include: an M2M gateway; the M2M gateway may include: a determination module, configured to acquire an identifier of a terminal peripheral initiating a deregistering request, and determine, according to the terminal peripheral identifier, a terminal peripheral group identifier allocated to the terminal peripheral. In the embodiment, the group identifier may be used for identifying a terminal peripheral group to which the terminal peripheral belongs; and a first sending module, configured to send the terminal peripheral identifier and the terminal peripheral group identifier to an M2M application through an M2M service platform. In the embodiment, the identifier and the group identifier may be used for the M2M application to locally update or delete group configuration information corresponding to the terminal peripheral group.

In an exemplary embodiment, the determination module may include: a first receiving unit, configured to receive a first deregistering request message from the terminal peripheral. In the exemplary embodiment, the first deregistering request message may carry the terminal peripheral identifier; and a retrieval unit, configured to locally retrieve the terminal peripheral group identifier according to the terminal peripheral identifier.

In an exemplary embodiment, the first sending module may include: a second receiving unit, configured to receive a second deregistering request message from the M2M gateway.

In the exemplary embodiment, the second deregistering request message may carry the terminal peripheral identifier, the terminal peripheral group identifier and an application port identifier corresponding to the terminal peripheral; and a sending unit, configured to send a configuration update notification message to the M2M application according to the application port identifier. In the exemplary embodiment, the configuration update notification message may carry the terminal peripheral identifier and the terminal peripheral group identifier.

In an exemplary embodiment, the system may further include: the M2M application; and the M2M application may include: a first processing module, configured to locally update or delete a terminal peripheral group list according to the terminal peripheral identifier and the terminal peripheral group identifier.

In an exemplary embodiment, the system may further include: the M2M service platform; the M2M service platform may include: a first receiving module, configured to receive a configuration update response message from the M2M application; and a second processing module, configured to locally update or delete a terminal peripheral group list according to the terminal peripheral identifier and the terminal peripheral group identifier.

In an exemplary embodiment, the M2M gateway may further include: a second receiving module, configured to receive a deregistering response message from the M2M service platform, and update a state of the terminal peripheral from an online state set after registering into an offline state; and a second sending module, configured to send a deregistering confirmation message to the terminal peripheral.

According to another aspect of the embodiments of the present disclosure, a standby processing system for a terminal peripheral is provided.

The standby processing system for the terminal peripheral according to the embodiment of the present disclosure may include: an M2M gateway; the M2M gateway may include: a first receiving module, configured to receive a group service request message from an M2M application through an M2M service platform. In the embodiment, the group service request message may carry a terminal peripheral group identifier to which the group service request message is to be distributed; and a distribution module, configured to distribute the group service request message to all terminal peripherals in a terminal peripheral group corresponding to the terminal peripheral group identifier after activating part or all of terminal peripherals in a standby state in the terminal peripheral group.

In an exemplary embodiment, the M2M gateway may further include: a second receiving module, configured to receive a standby request message from one or more terminal peripherals in the terminal peripheral group. In the exemplary embodiment, the standby request messages may carry a terminal peripheral identifier of each terminal peripheral; and a first sending module, configured to update the state of each of the one or more terminal peripherals from an online state into the standby state according to the terminal peripheral identifier of each terminal peripheral, and send a standby confirmation message to the one or more terminal peripherals.

In an exemplary embodiment, the system may further include: the M2M service platform; the M2M service platform may include: an authentication module, configured to perform service authentication on the M2M application; and a forwarding module, configured to forward the group service request message to the M2M gateway after successfully authenticating the M2M application.

In an exemplary embodiment, the M2M gateway may further include: a determination module, configured to acquire the state of each terminal peripheral in the terminal peripheral group according to the terminal peripheral group identifier, and determine part or all of the terminal peripherals in the standby state; and a second sending module, configured to send an activation request message to part or all of the terminal peripherals in the standby state. In the exemplary embodiment, the activation request message may be used for restoring part or all of the terminal peripherals in the standby state from the standby state to an online state.

In an exemplary embodiment, the distribution module may include: a determination unit, configured to determine that all the terminal peripherals in the terminal peripheral group are in the online state according to an activation response message; and a distribution unit, configured to distribute the group service request message to the terminal peripherals according to a terminal peripheral identifier of each terminal peripheral in the terminal peripheral group.

According to the embodiments of the present disclosure, the M2M gateway pre-allocates a group identifier of a terminal peripheral group to a terminal peripheral configured into the terminal peripheral group by an M2M user, and sets an initial state of the terminal peripheral, the group identifier being used for identifying the terminal peripheral group to which the terminal peripheral belongs; the M2M gateway acquires a terminal peripheral identifier from a terminal peripheral initiating a registering request, and determines the terminal peripheral group identifier pre-allocated to the terminal peripheral according to the terminal peripheral identifier; and the M2M gateway sends the terminal peripheral identifier and the terminal peripheral group identifier to an M2M service platform, then the M2M service platform forwards the terminal peripheral identifier and the terminal peripheral group identifier to the M2M application, and the terminal peripheral identifier and the terminal peripheral group identifier may be used for the M2M application to locally create or update the group configuration information corresponding to the terminal peripheral group after the M2M application certificates and authorizes the terminal peripheral. Therefore, the problem that there is no effective mechanism for group management of the M2M gateway over terminal peripherals in the related technology is solved, and a network can implement effective group management over the terminal peripherals through the M2M gateway.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
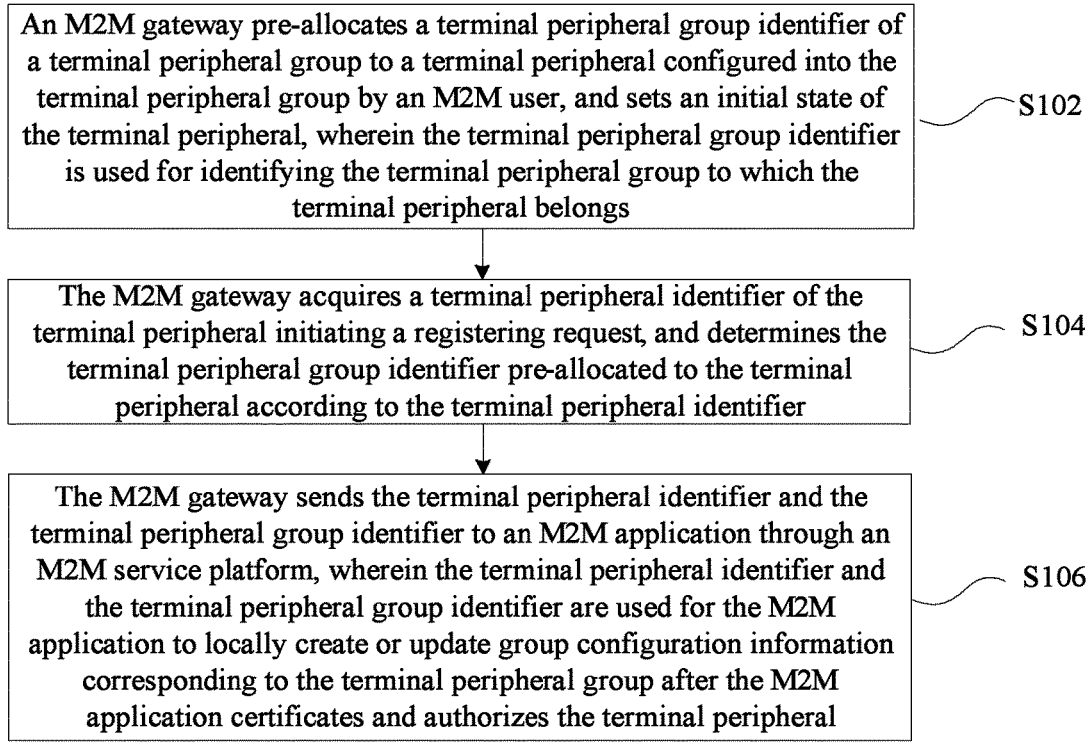
FIG. 1 is a flowchart of a registering method for a terminal peripheral according to an embodiment of the present disclosure.

FIG. 1 is a flowchart of a registering method for a terminal peripheral according to an embodiment of the present disclosure. As shown in FIG. 1, the method may include the following processing steps:

Step S102: an M2M gateway pre-allocates a terminal peripheral group identifier of a terminal peripheral group to a terminal peripheral configured into the terminal peripheral group by an M2M user, and sets an initial state of the terminal peripheral. In the embodiment, the terminal peripheral group identifier is used for identifying the terminal peripheral group to which the terminal peripheral belongs.

Step S104: the M2M gateway acquires a terminal peripheral identifier of the terminal peripheral initiating a registering request, and determines the terminal peripheral group identifier pre-allocated to the terminal peripheral according to the terminal peripheral identifier.

Step S106: the M2M gateway sends the terminal peripheral identifier and the terminal peripheral group identifier to an M2M application through an M2M service platform. In the embodiment, the terminal peripheral identifier and the terminal peripheral group identifier are used for the M2M application to locally create or update group configuration information corresponding to the terminal peripheral group after the M2M application certificates and authorizes the terminal peripheral.

There is no effective mechanism for group management of the M2M gateway over terminal peripherals in the related technology. According to the method shown in FIG. 1, the M2M gateway pre-allocates a terminal peripheral group identifier of a terminal peripheral group to a terminal peripheral configured into the terminal peripheral group by an M2M user, and sets an initial state of the terminal peripheral, the terminal peripheral group identifier being used for identifying the terminal peripheral group to which the terminal peripheral belongs. The M2M gateway acquires a terminal peripheral identifier from a terminal peripheral initiating a registering request, and determines the terminal peripheral group identifier pre-allocated to the terminal peripheral according to the terminal peripheral identifier. The M2M gateway sends the terminal peripheral identifier and the terminal peripheral group identifier to the M2M service platform. The M2M service platform then forwards the terminal peripheral identifier and the terminal peripheral group identifier to the M2M application. In the embodiment, the terminal peripheral identifier and the terminal peripheral group identifier may be used for the M2M application to locally create or update the group configuration information corresponding to the terminal peripheral group after the M2M application certificates and authorizes the terminal peripheral. Therefore, the problem that there is no effective mechanism for group management of a network over terminal peripherals in the related technology is solved, and the network can implement effective group management over the terminal peripherals through the M2M gateway.

In an exemplary embodiment, the step that the M2M gateway acquires the terminal peripheral identifier and determines the terminal peripheral group identifier according to the terminal peripheral identifier described in Step S104 may include the following operations:

Step S1: the M2M gateway receives a first registering request message from the terminal peripheral. In this embodiment, the first registering request message carries the terminal peripheral identifier and a security certificate.

Step S2: the M2M gateway locally retrieves the terminal peripheral group identifier after successfully authenticating the terminal peripheral according to the terminal peripheral identifier and the security certificate.

In an exemplary embodiment, the step that the M2M gateway sends the terminal peripheral identifier and the terminal peripheral group identifier to the M2M application through the M2M service platform described in Step S106 may include following steps:

Step S3: the M2M service platform receives a second registering request message from the M2M gateway. In this embodiment, the second registering request message carries the terminal peripheral identifier, the security certificate, the terminal peripheral group identifier and an application port identifier corresponding to the terminal peripheral.

Step S4: the M2M service platform sends a configuration update notification message to the M2M application according to the application port identifier after successfully authenticating the terminal peripheral according to the terminal peripheral identifier and the security certificate. In this embodiment, the configuration update notification message carries the terminal peripheral identifier and the terminal peripheral group identifier.

In an exemplary embodiment, after the M2M gateway sending the terminal peripheral identifier and the terminal peripheral group identifier to the M2M application through the M2M service platform in Step S106, the method may further include the following operation:

Step S5: the M2M application locally creates or updates a terminal peripheral group list according to the terminal peripheral identifier and the terminal peripheral group identifier after certificating and authorizing the terminal peripheral.

In an exemplary embodiment, after the M2M gateway sending the terminal peripheral identifier and the terminal peripheral group identifier to the M2M application through the M2M service platform in Step S106, the method may further include the following steps:

Step S6: the M2M service platform receives a configuration update response message from the M2M application. In this embodiment, the configuration update response message carries authorization information of the terminal peripheral.

Step S7: the M2M service platform locally creates or updates a terminal peripheral group list according to the terminal peripheral identifier and the terminal peripheral group identifier after acquiring the authorization information.

In an exemplary embodiment, after the M2M service platform creating or updating the terminal peripheral group list in Step S7, the method may further include the following operations:

Step S8: the M2M gateway receives a registering response message from the M2M service platform, and updates a state of the terminal peripheral from an offline state initially set before registering is initiated into an online state.

Step S9: the M2M gateway sends a registering confirmation message to the terminal peripheral.

In an exemplary embodiment, the adopted registering flow for the terminal peripheral is described in detail as follows. The M2M gateway pre-allocates the terminal peripheral group identifier to the terminal peripheral, and sets a state parameter of the terminal peripheral to be "offline". After being powered on, the terminal peripheral sends a registering request to the M2M gateway. The M2M gateway sends the registering request to the M2M service platform after successfully authenticating the terminal peripheral. The M2M service platform sends a configuration update notice to the M2M application after successfully authenticating the terminal peripheral. The M2M application sends the authorization information of the terminal peripheral to the M2M service platform through the configuration update notification message after authorizing and verifying the terminal peripheral, and locally creates or updates the terminal peripheral group list in subscription information of the M2M user. The M2M service platform locally creates or updates the terminal peripheral group list in configuration information of the terminal peripheral after receiving the authorization information of the terminal peripheral, and sends a registering response to the M2M gateway. The M2M gateway sets a value of the state parameter of the terminal peripheral to be "online" after receiving the registering response, and sends registering confirmation to the terminal peripheral.

Figure 2:
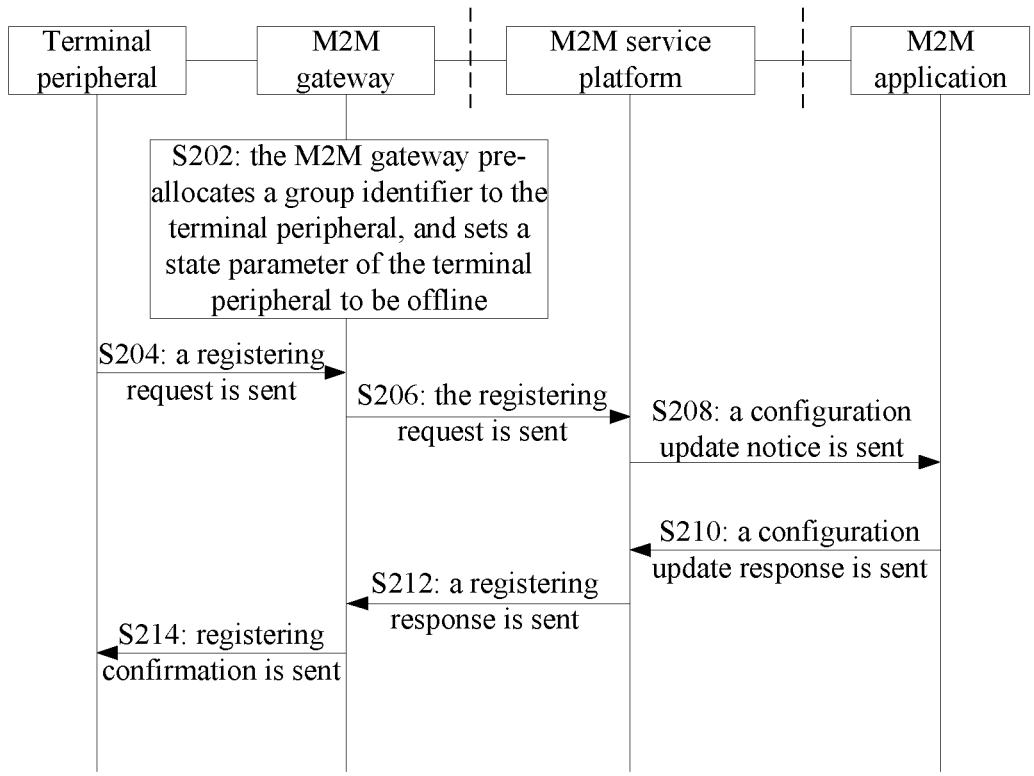
FIG. 2 is a flowchart of a registering process for a terminal peripheral according to exemplary embodiment 1 of the present disclosure.

FIG. 2 is a flowchart of a registering process for a terminal peripheral according to exemplary embodiment 1 of the present disclosure. As shown in FIG. 2, as an exemplary embodiment of the present disclosure, the flow may include the following processing steps:

Step S202: an M2M user configures terminal peripherals in a group to be terminal peripherals with a group characteristic. An M2M gateway pre-allocates a terminal peripheral group identifier to each terminal peripheral as configuration information of the terminal peripheral for local storage. Simultaneously, the M2M gateway sets a state parameter in the configuration information of the terminal peripheral, and sets a value of the state parameter to be "offline".

Step S204: the terminal peripheral sends a registering request to the M2M gateway after being powered on. In the embodiment, the registering request carries a terminal peripheral identifier and a security certificate.

Step S206: the M2M gateway retrieves the pre-allocated terminal peripheral group identifier from the locally stored configuration information of the terminal peripheral according to the terminal peripheral identifier after successfully authenticating the terminal peripheral identifier and the security certificate, and sends the registering request to an M2M service platform. In the embodiment, the registering request carries the terminal peripheral identifier, the security certificate, the terminal peripheral group identifier and an application port identifier corresponding to the terminal peripheral subscribed by the M2M user.

Step S208: the M2M service platform retrieves an M2M application corresponding to the terminal peripheral subscribed by the M2M user according to the application port identifier after successfully authenticating the terminal peripheral identifier and the security certificate, and sends a configuration update notice to the M2M application. In the embodiment, the configuration update notice carries the terminal peripheral identifier and the terminal peripheral group identifier.

Step S210: the M2M application sends authorization information of the terminal peripheral to the M2M service platform through a configuration update response message after authorizing and verifying the terminal peripheral by checking the subscription information of the M2M user, and the M2M application creates or updates a terminal peripheral group list in the locally stored subscription information of the M2M user according to the terminal peripheral group identifier and the terminal peripheral identifier.

Step S212: the M2M service platform creates or updates the terminal peripheral group list in the locally stored configuration information of the terminal peripheral according to the terminal peripheral identifier and the terminal peripheral group identifier after receiving the authorization information of the terminal peripheral, and sends a registering response to the M2M gateway.

Step S214: the M2M gateway sets the value of the state parameter of the terminal peripheral to be "online" in the locally stored configuration information of the terminal peripheral after receiving the registering response, and sends registering confirmation to the terminal peripheral.

Figure 3:
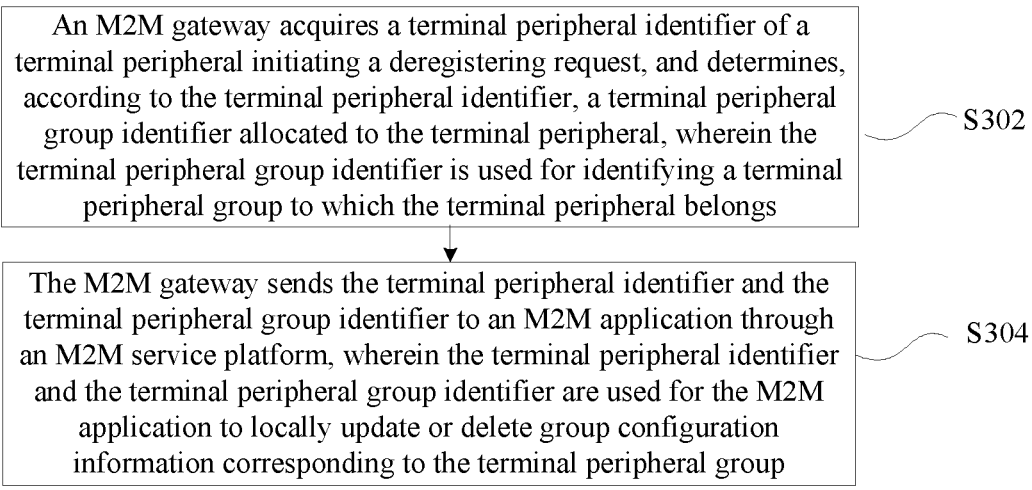
FIG. 3 is a flowchart of a deregistering method for a terminal peripheral according to an embodiment of the present disclosure.

FIG. 3 is a flowchart of a deregistering method for a terminal peripheral according to an embodiment of the present disclosure. As shown in FIG. 3, the method may include the following processing steps:

Step S302: an M2M gateway acquires a terminal peripheral identifier of a terminal peripheral initiating a deregistering request, and determines, according to the terminal peripheral identifier, a terminal peripheral group identifier allocated to the terminal peripheral. In the embodiment, the terminal peripheral group identifier is used for identifying a terminal peripheral group to which the terminal peripheral belongs.

Step S304: the M2M gateway sends the terminal peripheral identifier and the terminal peripheral group identifier to an M2M application through an M2M service platform. In the embodiment, the terminal peripheral identifier and the terminal peripheral group identifier are used for the M2M application to locally update or delete group configuration information corresponding to the terminal peripheral group.

By the method shown in FIG. 3, the problem that there is no effective mechanism for group management of the M2M gateway over terminal peripherals in the related technology is solved, and a network can implement effective group management over the terminal peripherals through the M2M gateway.

In an exemplary embodiment, the step that the M2M gateway acquires the terminal peripheral identifier and determines the terminal peripheral group identifier according to the terminal peripheral identifier described in Step S302 may include the following operations:

Step S10: the M2M gateway receives a first deregistering request message from the terminal peripheral. In the embodiment, the first deregistering request message carries the terminal peripheral identifier.

Step S11: the M2M gateway locally retrieves the terminal peripheral group identifier according to the terminal peripheral identifier.

In an exemplary embodiment, the step that the M2M gateway sends the terminal peripheral identifier and the terminal peripheral group identifier to the M2M application through the M2M service platform described in Step S304 may include the following steps:

Step S12: the M2M service platform receives a second deregistering request message from the M2M gateway. In the embodiment, the second deregistering request message carries the terminal peripheral identifier, the terminal peripheral group identifier and an application port identifier corresponding to the terminal peripheral.

Step S13: the M2M service platform sends a configuration update notification message to the M2M application according to the application port identifier. In the embodiment, the configuration update notification message carries the terminal peripheral identifier and the terminal peripheral group identifier.

In an exemplary embodiment, after the M2M gateway sends the terminal peripheral identifier and the terminal peripheral group identifier to the M2M application through the M2M service platform described in Step S304, the method may further include the following operation:

Step S14: the M2M application locally updates or deletes a terminal peripheral group list according to the terminal peripheral identifier and the terminal peripheral group identifier.

In an exemplary embodiment, after the step that the M2M gateway sends the terminal peripheral identifier and the terminal peripheral group identifier to the M2M application through the M2M service platform described in Step S304, the method may further include the following steps:

Step S15: the M2M service platform receives a configuration update response message from the M2M application.

Step S16: the M2M service platform locally updates or deletes a terminal peripheral group list according to the terminal peripheral identifier and the terminal peripheral group identifier.

In an exemplary embodiment, after the step that the M2M service platform updates or deletes the terminal peripheral group list described in Step S16, the method may further include the following processing:

Step S17: the M2M gateway receives a deregistering response message from the M2M service platform, and updates a state of the terminal peripheral from an online state set after registering into an offline state.

Step S18: the M2M gateway sends a deregistering confirmation message to the terminal peripheral.

In an exemplary embodiment, the adopted deregistering flow for the terminal peripheral is described in detail as follows. When being shut down, the terminal peripheral sends a deregistering request to the M2M gateway. The M2M gateway sends the deregistering request to the M2M service platform. The M2M service platform sends a configuration update notice to the M2M application. The M2M application updates or deletes the terminal peripheral group list in local subscription information of an M2M user, and sends the configuration update notice to the M2M service platform. The M2M service platform updates or deletes the terminal peripheral group list in local configuration information of the terminal peripheral, and sends a deregistering response to the M2M gateway. The M2M gateway sets a value of a state parameter of the terminal peripheral to be "offline" after receiving the deregistering response, and sends deregistering confirmation to the terminal peripheral.

Figures 4, 5:
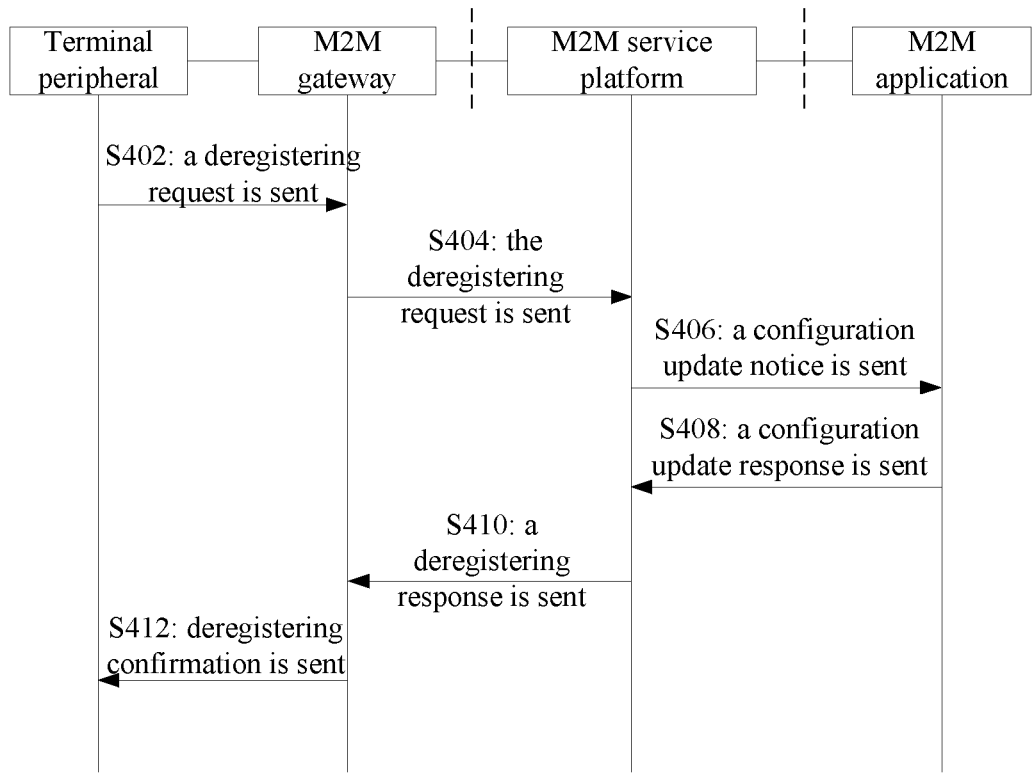
FIG. 4 is a flowchart of a deregistering process for a terminal peripheral according to exemplary embodiment 2 of the present disclosure.
FIG. 5 is a flowchart of a standby processing method for a terminal peripheral according to an embodiment of the present disclosure.

As another exemplary embodiment of the present disclosure, FIG. 4 is a flowchart of a deregistering process for a terminal peripheral according to exemplary embodiment 2 of the present disclosure. As shown in FIG. 4, the flow may include the following processing steps:

Step S402: a terminal peripheral sends a deregistering request to an M2M gateway when being shut down. In the embodiment, the deregistering request carries a terminal peripheral identifier.

Step S404: the M2M gateway retrieves a terminal peripheral group identifier in locally stored configuration information of the terminal peripheral according to the terminal peripheral identifier, and sends the deregistering request to an M2M service platform. In the embodiment, the deregistering request carries the terminal peripheral identifier, the terminal peripheral group identifier and an application port identifier corresponding to the terminal peripheral subscribed by an M2M user.

Step S406: the M2M service platform retrieves an M2M application corresponding to the terminal peripheral subscribed by the M2M user according to the application port identifier, and sends a configuration update notice to the M2M application. In the embodiment, the configuration update notice carries the terminal peripheral identifier and the terminal peripheral group identifier.

Step S408: the M2M application updates or deletes a terminal peripheral group list in locally stored subscription information of the M2M user according to the terminal peripheral group identifier and the terminal peripheral identifier, and sends a configuration update response to the M2M service platform.

Step S410: the M2M service platform updates or deletes the terminal peripheral group list in the locally stored configuration information of the terminal peripheral according to the terminal peripheral identifier and the terminal peripheral group identifier after receiving the configuration update response, and the M2M service platform sends a deregistering response to the M2M gateway.

Step S412: the M2M gateway sets a value of the state parameter of the terminal peripheral to be "offline" in the locally stored configuration information of the terminal peripheral after receiving the deregistering response, and the M2M service platform sends deregistering confirmation to the terminal peripheral.

FIG. 5 is a flowchart of a standby processing method for a terminal peripheral according to an embodiment of the present disclosure. As shown in FIG. 5, the method may include the following processing steps:

Step S502: an M2M gateway receives a group service request message from an M2M application through an M2M service platform. In the embodiment, the group service request message carries a terminal peripheral group identifier to which the group service request message is to be distributed.

Step S504: the M2M gateway distributes the group service request message to all terminal peripherals in a terminal peripheral group corresponding to the terminal peripheral group identifier after activating part or all of terminal peripherals in a standby state in the terminal peripheral group.

By the method shown in FIG. 5, the problem that there is no effective mechanism for group management of the M2M gateway over terminal peripherals in the related technology is solved, and a network can implement effective group management over the terminal peripherals through the M2M gateway.

In an exemplary embodiment, before the step that the M2M gateway receives the group service request message from the M2M application through the M2M service platform described in Step S502, the method may further include the following operations:

Step S19: the M2M gateway receives a standby request message from one or more terminal peripherals in the terminal peripheral group. In the embodiment, the standby request message carries a terminal peripheral identifier of each terminal peripheral.

Step S20: the M2M gateway updates the state of each of the one or more terminal peripherals from an online state into the standby state according to the terminal peripheral identifier of each terminal peripheral, and sends a standby confirmation message to the one or more terminal peripherals.

In an exemplary embodiment, the step that the M2M gateway receives the group service request message from the M2M application through the M2M service platform described in Step S504 may include the following steps:

Step S21: the M2M service platform performs service authentication on the M2M application.

Step S22: the M2M service platform forwards the group service request message to the M2M gateway after successfully authenticating the M2M application.

In an exemplary embodiment, the step that the M2M gateway activates part or all of the terminal peripherals in the standby state described in Step S504 may include the following operations:

Step S23: the M2M gateway acquires the state of each terminal peripheral in the terminal peripheral group according to the terminal peripheral group identifier, and determines part or all of the terminal peripherals in the standby state.

Step S24: the M2M gateway sends an activation request message to part or all of the terminal peripherals in the standby state. In the embodiment, the activation request message is used for restoring part or all of the terminal peripherals in the standby state from the standby state to an online state.

In an exemplary embodiment, the step that the M2M gateway distributes the group service request message to all the terminal peripherals in the terminal peripheral group described in Step S504 may include the following steps:

Step S25: the M2M gateway determines that all the terminal peripherals in the terminal peripheral group are in the online state according to an activation response message.

Step S26: the M2M gateway distributes the group service request message to the terminal peripherals according to a terminal peripheral identifier of each terminal peripheral in the terminal peripheral group.

In an exemplary embodiment, the adopted standby processing flow for the terminal peripheral is described in detail as follows. The terminal peripheral sends a standby request to the M2M gateway when the terminal peripheral is in a standby state. The M2M gateway sets a state parameter of the terminal peripheral to be "standby", and sends standby confirmation to the terminal peripheral. The M2M application sends a service request to the M2M service platform when the M2M application initiates a group service. In the embodiment, the service request carries the terminal peripheral group identifier. The M2M service platform forwards the service request to the M2M gateway after successfully authenticating the M2M application. The M2M gateway queries the state parameter of the terminal peripheral in the terminal peripheral group according to the terminal peripheral group identifier, and if a value of the state parameter is "standby", the M2M gateway sends an activation request to the terminal peripheral. The terminal peripheral is recovered to the online state, and sends an activation response to the M2M gateway. The M2M gateway sets the value of the state parameter of the terminal peripheral to be "online" after receiving the activation response, and generates and distributes a new service request message to the terminal peripheral according to the terminal peripheral identifier.

Figure 6:
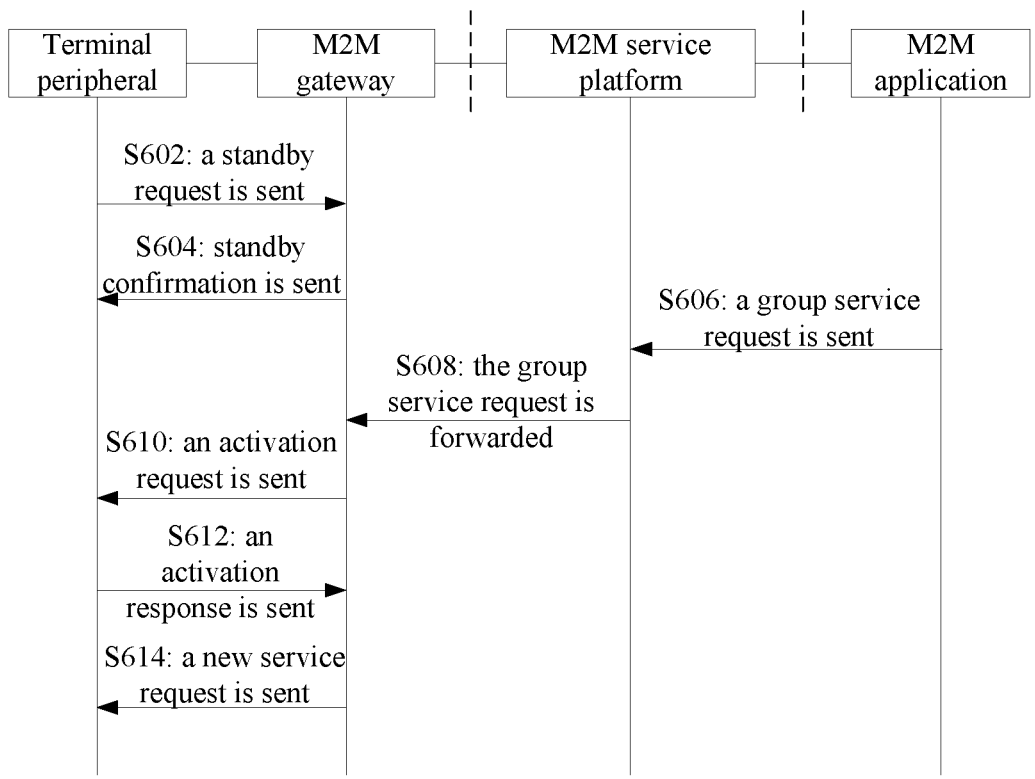
FIG. 6 is a flowchart of a standby processing process for a terminal peripheral according to exemplary embodiment 3 of the present disclosure.

FIG. 6 is a flowchart of a standby processing process for a terminal peripheral according to exemplary embodiment 3 of the present disclosure. As shown in FIG. 6, as another exemplary embodiment of the present disclosure, the flow may include the following processing steps:

Step S602: a terminal peripheral sends a standby request to an M2M gateway when being in a standby state. In the embodiment, the standby request carries a terminal peripheral identifier.

Step S604: the M2M gateway sets a value of a state parameter of the terminal peripheral to be "standby" in locally stored configuration information of the terminal peripheral, and sends standby confirmation to the terminal peripheral.

Step S606: an M2M application sends a group service request to an M2M service platform according to a service logic judgment when initiating a group service. In the embodiment, the group service request carries a terminal peripheral group identifier.

Step S608: the M2M service platform forwards the group service request to the M2M gateway after performing service authentication on the M2M application by checking subscription information of the M2M application.

Step S610: the M2M gateway queries, according to the terminal peripheral group identifier, the state parameter of each terminal peripheral in a terminal peripheral group from the locally stored configuration information of the terminal peripheral. If the value of the state value of the terminal peripheral is "standby", the M2M gateway may send an activation request to the terminal peripheral according to the terminal peripheral identifier.

Step S612: the terminal peripheral is recovered into an "online" state after receiving the activation request, and sends an activation response to the M2M gateway.

Step S614: the M2M gateway sets the value of the state parameter of the terminal peripheral to be "online" in the locally stored configuration information of the terminal peripheral after receiving the activation response, and the M2M gateway generates and distributes a new service request message to each terminal peripheral in the terminal peripheral group according to the terminal peripheral identifier.

Figure 7:
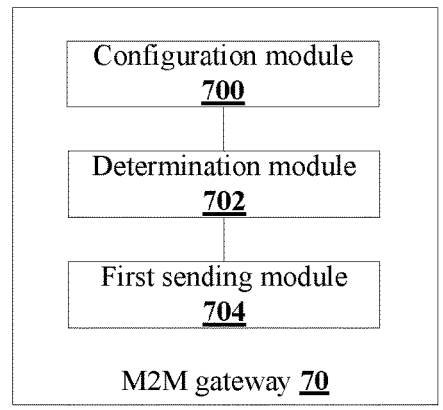
FIG. 7 is a structure block diagram of a registering system for a terminal peripheral according to an embodiment of the present disclosure.

FIG. 7 is a structure block diagram of a registering system for a terminal peripheral according to an embodiment of the present disclosure. As shown in FIG. 7, the registering system for the terminal peripheral may include: an M2M gateway 70; the M2M gateway 70 may include: a configuration module 700, configured to pre-allocate a terminal peripheral group identifier of a terminal peripheral group to a terminal peripheral configured into the terminal peripheral group by an M2M user, and set an initial state of the terminal peripheral. In the embodiment, the terminal peripheral group identifier is used for identifying the terminal peripheral group to which the terminal peripheral belongs. The registering system for the terminal peripheral may further include: a determination module 702, configured to acquire a terminal peripheral identifier of the terminal peripheral initiating a registering request, and determine the terminal peripheral group identifier pre-allocated to the terminal peripheral according to the terminal peripheral identifier; and a first sending module 704, configured to send the terminal peripheral identifier and the terminal peripheral group identifier to an M2M application through an M2M service platform. In the embodiment, the terminal peripheral identifier and the terminal peripheral group identifier are used for the M2M application to locally create or update group configuration information corresponding to the terminal peripheral group after the M2M application certificates and authorizes the terminal peripheral.

In an exemplary embodiment, the determination module 700 may include: a first receiving unit (not shown in the figure), configured to receive a first registering request message from the terminal peripheral. In the embodiment, the first registering request message carries the terminal peripheral identifier and a security certificate. The determination module 700 may further include: a retrieval unit (not shown in the figure), configured to locally retrieve the terminal peripheral group identifier after successfully authenticating the terminal peripheral according to the terminal peripheral identifier and the security certificate.

In an exemplary embodiment, the first sending module 702 may include: a second receiving unit (not shown in the figure), configured to receive a second registering request message from the M2M gateway. In the embodiment, the second registering request message carries the terminal peripheral identifier, the security certificate, the terminal peripheral group identifier and an application port identifier corresponding to the terminal peripheral. The first sending module 702 may further include: a sending unit (not shown in the figure), configured to send a configuration update notification message to the M2M application according to the application port identifier after successfully authenticating the terminal peripheral according to the terminal peripheral identifier and the security certificate. In the embodiment, the configuration update notification message carries the terminal peripheral identifier and the terminal peripheral group identifier.

Figure 8:
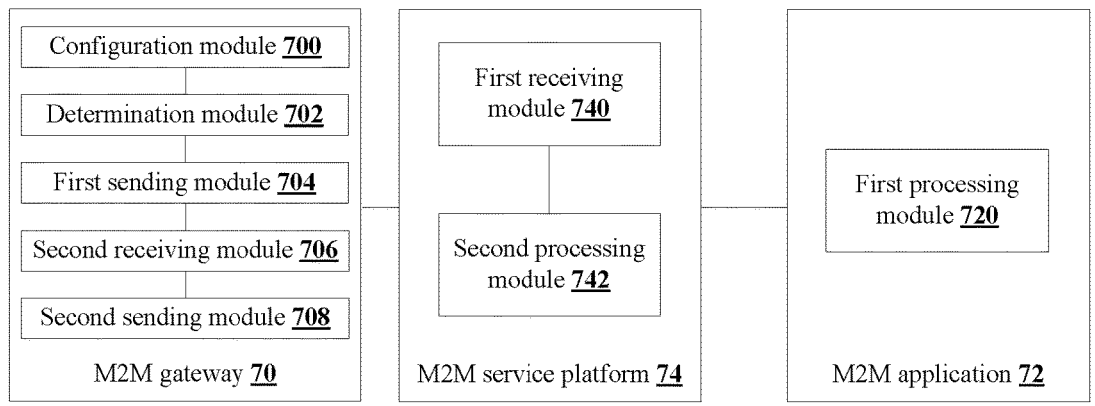
FIG. 8 is a structure block diagram of a registering system for a terminal peripheral according to an exemplary embodiment of the present disclosure.

In an exemplary embodiment, as shown in FIG. 8, the system may further include: the M2M application 72; and the M2M application 72 may include: a first processing module 720, configured to locally create or update a terminal peripheral group list according to the terminal peripheral identifier and the terminal peripheral group identifier after certificating and authorizing the terminal peripheral.

In an exemplary embodiment, as shown in FIG. 8, the system may further include: the M2M service platform 74. The M2M service platform 74 may include: a first receiving module 740, configured to receive a configuration update response message from the M2M application. In the embodiment, the configuration update response message carries authorization information of the terminal peripheral. The M2M service platform 74 may further include: a second processing module 742, configured to locally create or update a terminal peripheral group list according to the terminal peripheral identifier and the terminal peripheral group identifier after acquiring the authorization information.

In an exemplary embodiment, as shown in FIG. 8, the M2M gateway 70 may further include: a second receiving module 706, configured to receive a registering response message from the M2M service platform, and update a state of the terminal peripheral from an offline state initially set before registering is initiated into an online state; and a second sending module 708, configured to send a registering confirmation message to the terminal peripheral.

Figure 9:
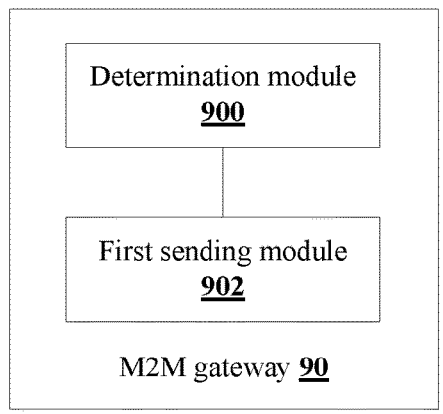
FIG. 9 is a structure block diagram of a deregistering system for a terminal peripheral according to an embodiment of the present disclosure.

FIG. 9 is a structure block diagram of a deregistering system for a terminal peripheral according to an embodiment of the present disclosure. As shown in FIG. 9, the deregistering system for the terminal peripheral may include: an M2M gateway 90. The M2M gateway 90 may include: a determination module 900, configured to acquire a terminal peripheral identifier of a terminal peripheral initiating a deregistering request, and determine, according to the terminal peripheral identifier, a terminal peripheral group identifier allocated to the terminal peripheral. In the embodiment, the group identifier is used for identifying a terminal peripheral group to which the terminal peripheral belongs. The M2M gateway 90 may further include: a first sending module 902, configured to send the terminal peripheral identifier and the terminal peripheral group identifier to an M2M application through an M2M service platform. In the embodiment, the terminal peripheral identifier and the terminal peripheral group identifier are used for the M2M application to locally update or delete group configuration information corresponding to the terminal peripheral group.

In an exemplary embodiment, the determination module 900 may include: a first receiving unit (not shown in the figure), configured to receive a first deregistering request message from the terminal peripheral. In the embodiment, the first deregistering request message carries the terminal peripheral identifier; and a retrieval unit (not shown in the figure), configured to locally retrieve the terminal peripheral group identifier according to the terminal peripheral identifier.

In an exemplary embodiment, the first sending module 902 may include: a second receiving unit (not shown in the figure), configured to receive a second deregistering request message from the M2M gateway. In the embodiment, the second deregistering request message carries the terminal peripheral identifier, the terminal peripheral group identifier and an application port identifier corresponding to the terminal peripheral. The first sending module 902 may further include: a sending unit (not shown in the figure), configured to send a configuration update notification message to the M2M application according to the application port identifier. In the embodiment, the configuration update notification message carries the terminal peripheral identifier and the terminal peripheral group identifier.

Figure 10:
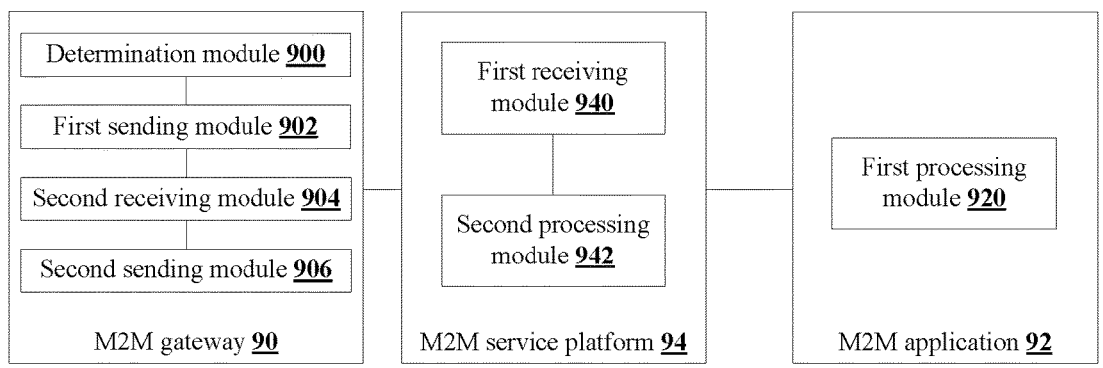
FIG. 10 is a structure block diagram of a deregistering system for a terminal peripheral according to an exemplary embodiment of the present disclosure.

In an exemplary embodiment, as shown in FIG. 10, the system may further include: the M2M application 92; and the M2M application 92 may include: a first processing module 920, configured to locally update or delete a terminal peripheral group list according to the terminal peripheral identifier and the terminal peripheral group identifier.

In an exemplary embodiment, as shown in FIG. 10, the system may further include: the M2M service platform 94.

The M2M service platform 94 may include: a first receiving module 940, configured to receive a configuration update response message from the M2M application; and a second processing module 942, configured to locally update or delete a terminal peripheral group list according to the terminal peripheral identifier and the terminal peripheral group identifier.

In an exemplary embodiment, as shown in FIG. 10, the M2M gateway 90 may further include: a second receiving module 904, configured to receive a deregistering response message from the M2M service platform, and update a state of the terminal peripheral from an online state set after registering into an offline state; and a second sending module 906, configured to send a deregistering confirmation message to the terminal peripheral.

Figure 11:
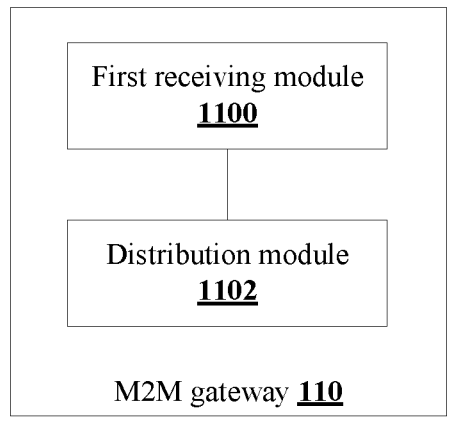
FIG. 11 is a structure block diagram of a standby processing system for a terminal peripheral according to an embodiment of the present disclosure.

FIG. 11 is a structure block diagram of a standby processing system for a terminal peripheral according to an embodiment of the present disclosure. As shown in FIG. 11, the standby processing system for the terminal peripheral may include: an M2M gateway 110. The M2M gateway 110 may include: a first receiving module 1100, configured to receive a group service request message from an M2M application through an M2M service platform. In the embodiment, the group service request message carries a terminal peripheral group identifier to which the group service request message is to be distributed. The M2M gateway 110 may further include: a distribution module 1102, configured to distribute the group service request message to all terminal peripherals in a terminal peripheral group corresponding to the terminal peripheral group identifier after activating part or all of terminal peripherals in a standby state in the terminal peripheral group.

Figure 12:
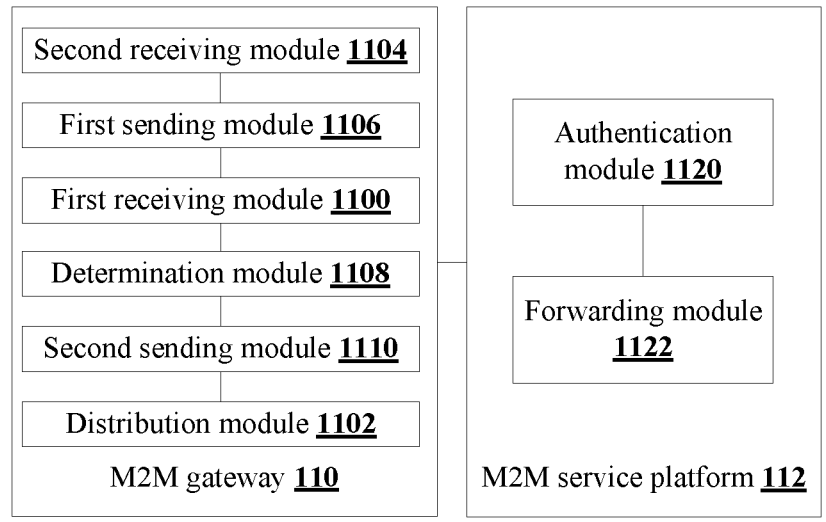
FIG. 12 is a structure block diagram of a standby processing system for a terminal peripheral according to an exemplary embodiment of the present disclosure.

In an exemplary embodiment, as shown in FIG. 12, the M2M gateway 110 may further include: a second receiving module 1104, configured to receive a standby request message from one or more terminal peripherals in the terminal peripheral group. In the embodiment, the standby request message carries a terminal peripheral identifier of each terminal peripheral. The M2M gateway 110 may further include: a first sending module 1106, configured to update the state of each of the one or more terminal peripherals from an online state into the standby state according to the terminal peripheral identifier of each terminal peripheral, and send a standby confirmation message to the one or more terminal peripherals.

In an exemplary embodiment, as shown in FIG. 12, the system may further include: the M2M service platform 112. The M2M service platform 112 may include: an authentication module 1120, configured to perform service authentication on the M2M application; and a forwarding module 1122, configured to forward the group service request message to the M2M gateway after successfully authenticating the M2M application.

In an exemplary embodiment, as shown in FIG. 12, the M2M gateway 110 may further include: a determination module 1108, configured to acquire the state of each terminal peripheral in the terminal peripheral group according to the terminal peripheral group identifier, and determine part or all of the terminal peripherals in the standby state; and a second sending module 1110, configured to send an activation request message to part or all of the terminal peripherals in the standby state. In the embodiment, the activation request message is used for restoring part or all of the terminal peripherals in the standby state from the standby state to an online state.

In an exemplary embodiment, the distribution module 1102 may include: a determination unit (not shown in the figure), configured to determine that all the terminal peripherals in the terminal peripheral group are in the online state according to an activation response message; and a distribution unit (not shown in the figure), configured to distribute the group service request message to the terminal peripherals according to a terminal peripheral identifier of each terminal peripheral in the terminal peripheral group.

From the above, it can be seen that the embodiment achieves the following technical effects (it is important to note that these effects are effects achievable for some exemplary embodiments). According to the technical solutions provided by the embodiment of the present disclosure, the M2M gateway acquires a terminal peripheral identifier from a terminal peripheral initiating a registering request, and determines the terminal peripheral group identifier pre-allocated to the terminal peripheral according to the terminal peripheral identifier, the terminal peripheral group identifier being configured to indicate the terminal peripheral group to which the terminal peripheral belongs. The M2M gateway sends the terminal peripheral identifier and the terminal peripheral group identifier to the M2M service platform. The M2M service platform then forwards the terminal peripheral identifier and the terminal peripheral group identifier to the M2M application, the terminal peripheral identifier and the terminal peripheral group identifier being used for the M2M application to locally create or update the group configuration information corresponding to the terminal peripheral group after the M2M application certificates and authorizes the terminal peripheral. By virtue of the above technical solution, the problem that there is no effective mechanism for group management of the M2M gateway over terminal peripherals in the related technology is solved, and a network can implement effective group management over the terminal peripherals through the M2M gateway.

Obviously, those skilled in the art should know that each module or step of the present disclosure may be implemented by a universal computing device, and they may be concentrated on a single computing device or distributed on a network formed by multiple computing devices, and may optionally be implemented by programmable codes executable for the computing devices, so that the modules or steps may be stored in a storage device for execution with the computing devices, the shown or described steps may be executed in sequences different from those described here in some circumstances, or they may form each integrated circuit module respectively, or multiple modules or steps therein may form a single integrated circuit module for implementation. As a consequence, the present disclosure is not limited to any specific hardware and software combination.

The above is only the exemplary embodiment of the present disclosure and not intended to limit the present disclosure, and for those skilled in the art, the present disclosure may have various modifications and variations. Any modifications, equivalent replacements, improvements and the like within the principle of the present disclosure shall fall within the scope of protection defined by the appended claims of the present disclosure.

INDUSTRIAL APPLICABILITY

As mentioned above, the registering, deregistering and standby processing methods and systems for the terminal peripheral provided by the embodiments of the present disclosure have the following beneficial effect: the network can implement effective group management over terminal peripherals through the M2M gateway.

What is claimed is:

1. A registering method for a terminal peripheral, comprising:

pre-allocating, by a Machine-to-Machine/Man (M2M) gateway, a first terminal peripheral group identifier of a first terminal peripheral group to a terminal peripheral configured into the first terminal peripheral group by an M2M user, and setting, by the M2M gateway, an initial state of the terminal peripheral, wherein the first terminal peripheral group identifier is used for identifying the first terminal peripheral group to which the terminal peripheral belongs;

acquiring, by the M2M gateway, a terminal peripheral identifier of the terminal peripheral initiating a registering request, and determining, by the M2M gateway, the first terminal peripheral group identifier pre-allocated to the terminal peripheral according to the terminal peripheral identifier; and sending, by the M2M gateway, the terminal peripheral identifier and the first terminal peripheral group identifier to an M2M application through an M2M service platform, wherein the terminal peripheral identifier and the first terminal peripheral group identifier are used for the M2M application to locally create or update group configuration information corresponding to the first terminal peripheral group after the M2M application certificates and authorizes the terminal peripheral;

receiving, by the M2M gateway, a group service request message from the M2M application through the M2M service platform, wherein the group service request message carries a second terminal peripheral group identifier to which the group service request message is to be distributed; and distributing, by the M2M gateway, the group service request message to all terminal peripherals in a second terminal peripheral group corresponding to the second terminal peripheral group identifier after activating part or all of terminal peripherals in a standby state in the second terminal peripheral group.

2. The method as claimed in claim 1, wherein acquiring, by the M2M gateway, the terminal peripheral identifier and determining, by the M2M gateway, the first terminal peripheral group identifier according to the terminal peripheral identifier comprises:

receiving, by the M2M gateway, a first registering request message from the terminal peripheral, wherein the first registering request message carries the terminal peripheral identifier and a security certificate; and locally retrieving, by the M2M gateway, the first terminal peripheral group identifier after successfully authenticating the terminal peripheral according to the terminal peripheral identifier and the security certificate.

3. The method as claimed in claim 2, wherein sending, by the M2M gateway, the terminal peripheral identifier and the first terminal peripheral group identifier to the M2M application through the M2M service platform comprises:

receiving, by the M2M service platform, a second registering request message from the M2M gateway, wherein the second registering request message carries the terminal peripheral identifier, the security certificate, the first terminal peripheral group identifier and an application port identifier corresponding to the terminal peripheral; and sending, by the M2M service platform, a configuration update notification message to the M2M application according to the application port identifier after successfully authenticating the terminal peripheral according to the terminal peripheral identifier and the security certificate, wherein the configuration update notification message carries the terminal peripheral identifier and the first terminal peripheral group identifier.

4. The method as claimed in claim 3, after sending, by the M2M gateway, the terminal peripheral identifier and the first terminal peripheral group identifier to the M2M application through the M2M service platform, further comprising:

locally creating or updating, by the M2M application, a terminal peripheral group list according to the terminal peripheral identifier and the first terminal peripheral group identifier after certificating and authorizing the terminal peripheral.

5. The method as claimed in claim 3, after sending, by the M2M gateway, the terminal peripheral identifier and the first terminal peripheral group identifier to the M2M application through the M2M service platform, further comprising:

receiving, by the M2M service platform, a configuration update response message from the M2M application, wherein the configuration update response message carries authorization information of the terminal peripheral; and locally creating or updating, by the M2M service platform, a terminal peripheral group list according to the terminal peripheral identifier and the first terminal peripheral group identifier after acquiring the authorization information.

6. The method as claimed in claim 5, after creating or updating, by the M2M service platform, the terminal peripheral group list, further comprising:

receiving, by the M2M gateway, a registering response message from the M2M service platform, and updating, by the M2M gateway, a state of the terminal peripheral from an offline state initially set before registering is initiated into an online state; and sending, by the M2M gateway, a registering confirmation message to the terminal peripheral.

7. A deregistering method for a terminal peripheral, comprising:

acquiring, by a Machine-to-Machine/Man (M2M) gateway, a terminal peripheral identifier of a terminal peripheral initiating a deregistering request, and determining, by the M2M gateway according to the terminal peripheral identifier, a first terminal peripheral group identifier allocated to the terminal peripheral, wherein the first terminal peripheral group identifier is used for identifying a first terminal peripheral group to which the terminal peripheral belongs; and sending, by the M2M gateway, the terminal peripheral identifier and the first terminal peripheral group identifier to an M2M application through an M2M service platform, wherein the terminal peripheral identifier and the first terminal peripheral group identifier are used for the M2M application to locally update or delete group configuration information corresponding to the first terminal peripheral group;

receiving, by the M2M gateway, a group service request message from the M2M application through the M2M service platform, wherein the group service request message carries a second terminal peripheral group identifier to which the group service request message is to be distributed; and distributing, by the M2M gateway, the group service request message to all terminal peripherals in a second terminal peripheral group corresponding to the second terminal peripheral group identifier after activating part or all of terminal peripherals in a standby state in the second terminal peripheral group.

8. The method as claimed in claim 7, wherein acquiring, by the M2M gateway, the terminal peripheral identifier and determining, by the M2M gateway according to the terminal peripheral identifier, the first terminal peripheral group identifier comprises:
receiving, by the M2M gateway, a first deregistering request message from the terminal peripheral, wherein the first deregistering request message carries the terminal peripheral identifier; and
locally retrieving, by the M2M gateway, the first terminal peripheral group identifier according to the terminal peripheral identifier.

9. The method as claimed in claim 8, wherein sending, by the M2M gateway, the terminal peripheral identifier and the first terminal peripheral group identifier to the M2M application through the M2M service platform comprises:
receiving, by the M2M service platform, a second deregistering request message from the M2M gateway, wherein the second deregistering request message carries the terminal peripheral identifier, the first terminal peripheral group identifier and an application port identifier corresponding to the terminal peripheral; and
sending, by the M2M service platform, a configuration update notification message to the M2M application according to the application port identifier, wherein the configuration update notification message carries the terminal peripheral identifier and the first terminal peripheral group identifier.

10. The method as claimed in claim 9, after sending, by the M2M gateway, the terminal peripheral identifier and the first terminal peripheral group identifier to the M2M application through the M2M service platform, further comprising:
locally updating or deleting, by the M2M application, a terminal peripheral group list according to the terminal peripheral identifier and the first terminal peripheral group identifier.

11. The method as claimed in claim 8, after sending, by the M2M gateway, the terminal peripheral identifier and the first terminal peripheral group identifier to the M2M application through the M2M service platform, further comprising:
receiving, by the M2M service platform, a configuration update response message from the M2M application; and
locally updating or deleting, by the M2M service platform, a terminal peripheral group list according to the terminal peripheral identifier and the first terminal peripheral group identifier.

12. The method as claimed in claim 11, after updating or deleting, by the M2M service platform, the terminal peripheral group list, further comprising:
receiving, by the M2M gateway, a deregistering response message from the M2M service platform, and updating, by the M2M gateway, a state of the terminal peripheral from an online state set after registering into an offline state; and
sending, by the M2M gateway, a deregistering confirmation message to the terminal peripheral.

13. A standby processing method for a terminal peripheral, comprising:
receiving, by a Machine-to-Machine/Man (M2M) gateway, a group service request message from an M2M application through an M2M service platform, wherein the group service request message carries a terminal peripheral group identifier to which the group service request message is to be distributed; and
distributing, by the M2M gateway, the group service request message to all terminal peripherals in a terminal peripheral group corresponding to the terminal peripheral group identifier after activating part or all of terminal peripherals in a standby state in the terminal peripheral group.

14. The method as claimed in claim 13, before receiving, by the M2M gateway, the group service request message from the M2M application through the M2M service platform, further comprising:
receiving, by the M2M gateway, a standby request message from one or more terminal peripherals in the terminal peripheral group, wherein the standby request message carries a terminal peripheral identifier of each terminal peripheral; and
updating, by the M2M gateway, the state of each of the one or more terminal peripherals from an online state into the standby state according to the terminal peripheral identifier of each terminal peripheral, and sending, by the M2M gateway, a standby confirmation message to the one or more terminal peripherals.

15. The method as claimed in claim 13, wherein receiving, by the M2M gateway, the group service request message from the M2M application through the M2M service platform comprises:
performing, by the M2M service platform, service authentication on the M2M application; and
forwarding, by the M2M service platform, the group service request message to the M2M gateway after successfully authenticating the M2M application.

16. The method as claimed in claim 13, wherein activating, by the M2M gateway, part or all of the terminal peripherals in the standby state comprises:
acquiring, by the M2M gateway, the state of each terminal peripheral in the terminal peripheral group according to the terminal peripheral group identifier, and determining, by the M2M gateway, part or all of the terminal peripherals in the standby state; and
sending, by the M2M gateway, an activation request message to part or all of the terminal peripherals in the standby state, wherein the activation request message is used for restoring part or all of the terminal peripherals in the standby state from the standby state to an online state.

17. The method as claimed in claim 16, wherein distributing, by the M2M gateway, the group service request message to all the terminal peripherals in the terminal peripheral group comprises:
determining, by the M2M gateway, that all the terminal peripherals in the terminal peripheral group are in the online state according to an activation response message; and
distributing, by the M2M gateway, the group service request message to the terminal peripherals according to a terminal peripheral identifier of each terminal peripheral in the terminal peripheral group.

18. A standby processing system for implementing the standby processing method for a terminal peripheral as claimed in claim 13, comprising: a Machine-to-Machine/Man (M2M) gateway, wherein
the M2M gateway comprises:
a first receiving module, configured to receive a group service request message from an M2M application through an M2M service platform, wherein the group service request message carries a terminal peripheral group identifier to which the group service request message is to be distributed; and a distribution module, configured to distribute the group service request message to all terminal peripherals in a terminal peripheral group corresponding to the terminal peripheral group identifier after activating part or all of terminal peripherals in a standby state in the terminal peripheral group.

19. A registering system for implementing the registering method for a terminal peripheral as claimed in claim 1, comprising: a Machine-to-Machine/Man (M2M) gateway, wherein the M2M gateway comprises:

a configuration module, configured to pre-allocate a first terminal peripheral group identifier of a first terminal peripheral group to a terminal peripheral configured into the first terminal peripheral group by an M2M user, and set an initial state of the terminal peripheral, wherein the first terminal peripheral group identifier is used for identifying the first terminal peripheral group to which the terminal peripheral belongs;

a determination module, configured to acquire a terminal peripheral identifier of the terminal peripheral initiating a registering request, and determine the first terminal peripheral group identifier pre-allocated to the terminal peripheral according to the terminal peripheral identifier; and a first sending module, configured to send the terminal peripheral identifier and the first terminal peripheral group identifier to an M2M application through an M2M service platform, wherein the terminal peripheral identifier and the first terminal peripheral group identifier are used for the M2M application to locally create or update group configuration information corresponding to the first terminal peripheral group after the M2M application certificates and authorizes the terminal peripheral;

a first receiving module, configured to receive a group service request message from the M2M application through the M2M service platform, wherein the group service request message carries a second terminal peripheral group identifier to which the group service request message is to be distributed; and a distribution module, configured to distribute the group service request message to all terminal peripherals in a second terminal peripheral group corresponding to the second terminal peripheral group identifier after activating part or all of terminal peripherals in a standby state in the second terminal peripheral group.

20. A deregistering system for implementing the deregistering method for a terminal peripheral as claimed in claim 7, comprising: a Machine-to-Machine/Man (M2M) gateway, wherein the M2M gateway comprises:

a determination module, configured to acquire a terminal peripheral identifier of a terminal peripheral initiating a deregistering request, and determine, according to the terminal peripheral identifier, a first terminal peripheral group identifier allocated to the terminal peripheral, wherein the first terminal peripheral group identifier is used for identifying a first terminal peripheral group to which the terminal peripheral belongs; and a first sending module, configured to send the terminal peripheral identifier and the first terminal peripheral group identifier to an M2M application through an M2M service platform, wherein the terminal peripheral identifier and the first terminal peripheral group identifier are used for the M2M application to locally update or delete group configuration information corresponding to the first terminal peripheral group;

a first receiving module, configured to receive a group service request message from the M2M application through the M2M service platform, wherein the group service request message carries a second terminal peripheral group identifier to which the group service request message is to be distributed; and a distribution module, configured to distribute the group service request message to all terminal peripherals in a second terminal peripheral group corresponding to the second terminal peripheral group identifier after activating part or all of terminal peripherals in a standby state in the second terminal peripheral group.

* * * * *